Patented May 6, 1924.

1,493,320

UNITED STATES PATENT OFFICE.

MAX BUCHNER, OF HANOVER, GERMANY.

PROCESS FOR MANUFACTURING ALUMINUM HYDROXIDE.

No Drawing. Application filed August 30, 1921. Serial No. 497,071.

*To all whom it may concern:*

Be it known that I, MAX BUCHNER, a citizen of Germany, and a resident of Hanover, in the State of Prussia, Germany, have invented certain new and useful Improvements in a Process for Manufacturing Aluminum Hydroxide (for which I have filed applications for patents in Germany September 9th, 1916; February 7th, 1921; and April 4th, 1921), and I do hereby declare the following to be a full, clear, and exact description of the invention, such as will enable others skilled in the art to which it pertains to make and use the same.

This invention has for its object a process for making pure aluminum or compounds of aluminum from any materials containing alumina, whereby sulfates are used as decomposing means and ammonia as precipitant of the aluminum.

Heretofore not only the decomposition but also the precipitation was accompanied by special conditions resulting in losses which when working on a large scale made the operations unprofitable.

By my method such losses are avoided, and on the other hand precipitates are obtained that are easily filterable and soluble.

There is used for decomposing the alumina a double sulphate containing ammonia which by heating is at first separated into bisulphate and ammonia. By the thus formed bisulphate the alumina-containing material, for instance aluminia, bauxite, chamotte, is rendered soluble, and filtered from the insoluble residue, and the filtrate is precipitated by the ammonia obtained by dissociating the sulphate. Finally, the sulphate containing ammonia is recovered from the mother liquor.

Such sulphate can be the sulphate of ammonium transformed to bi-sulphate in the first part of the procedure working under atmospheric pressure or in vacuo. The decomposition of the bisulphate of ammonium is best done in autoclaves. Other bisulphates containing ammonia may be used.

For eliminating the iron from the decomposition solution from which the aluminum hydroxide is to be obtained sulphate of ammonium is employed. The impure salt resulating from the filtration and concentration of the reaction liquor is supplied with a hot saturated solution of sulphate of ammonium in excess. The resulting crystals of ammonia-alum are put in a solution containing ammonia in excess, having several times the quantity of ammonia required for precipitation, after having washed them with sulphate of ammonium. Then the hydroxide of aluminum formed from the sulphate of aluminum is separated and the mother liquor or the sulphate of aluminum recovered can be used for treating fresh quantities of materials.

If the mother liquor used contains too much impurities, the noxious combinations of iron are removed by a separate reaction with ammonia.

For decomposing the double sulphates there are used chambers or receptacles of aluminum, magnesium, silicium or alloys of these metals with each other or with other heavier metals thereby preventing contamination with iron from the usual iron containers.

Referring to my process now, the following is to be said: The material containing aluminum is not heated with sulphate of ammonium, only at first, in a separate operation, whereby ammonium-bisulphate is formed, by heating ammonium sulphate under atmospheric pressure or in vacuum. Then to the sulphate of ammonium in aqueous solution is added alumina or materials containing alumina to form a concentrated solution. Using autoclaves with pressure and heating, the reaction of the alumina-materials and the ammonium bisulphate takes place readily and without difficulty. It is very surprising that in this operation ammonium-alum is formed already at a low temperature according to the pressure, even at about 200°. Because this combination is precipitated almost neutral, there are technical advantages arising from the working of this material, especially in doing away with the use of expensive filtering cloths.

It is an astonishing fact, that the silicic acid of these aluminum combinations is precipitated in such a favorable form that it can be easily removed by deposition or filtration. By this an aluminum hydroxide nearly free from silicic acid is obtained, and an aluminum metal almost free from silicic acid may be made from the hydroxide.

The process also gives the technical advantage of making it possible to eliminate the iron from the ammonium alum as soon as this is formed, by adding aluminum sulphate before or during decomposition of the material containing alumina, for there are formed readily soluble alums of iron-ammonium that remain in solution during the separation of the more difficultly soluble ammonium-alums.

It is worthy of note that the solubility of the ammonium-bisulphate is not restricted fundamentally by adding sulphate of ammonium to the solution containing the bisulphate, as would be supposed theoretically.

Instead of ammonium-sulphates which by heating are transformed into bisulphates such bisulphates also can be used which contain metal as, for instance the sulphate of potassium-ammonium $SO_4KNH_4$, or of sodium-ammonium $SO_4NaNH_4$.

The precipitation of aluminum-hydroxide is obtained not only by the ammonia resulting from heating the ammonium sulphates or other sulphates of metal-ammonium, but by a surplus equivalent of several times the quantity required. By this operation an aluminum hydroxide well grained, easily washable and filterable and of a high content of aluminum is formed.

Specifically, the operation is as follows:

The salt-lye resulting from the decomposition, separated by filtering of the residues of silicic acid and containing the iron combinations, is added to a hot saturated solution of ammonium sulphate in excess. By cooling, crystallization is effected. The crystals of ammonium alum are washed with ammonium sulphate solution and then put in an ammonia solution containing ammonia in excess, i. e., containing several times the quantity required. The resulting aluminum hydroxide is separated by filtration from the mother liquor of ammonium sulphate, which is then used to purify new fluxing material.

The evaporation, i. e., concentration of the salt separated by filtration from the residues obtained in the fluxing, is an important preliminary step for removing iron. It can be attained only in this way, because the salt is carried in a hot, saturated solution of ammonium sulphate in excess. By other means it would be impossible to eliminate all the iron and the other impurities in one operation.

The washing of the alum crystals by a solution of ammonium sulphate saves repeated crystallization, and prevents solution losses as well as crystallization losses. These two means are an operation of purification especially short and good.

The precipitation of the aluminum hydroxide by putting the pure alum in the solution of ammonia with a surplus of ammonia of several times the quantity required results in a pure precipitate free of complex combinations. By the precipitation the radicals of ammonia and acid are not wasted. Besides, the precipitate formed under such conditions is grained free of water, well filterable and can be washed rapidly.

The mother liquor of ammonium sulphate, containing the iron, from which the ammonia-alum is obtained, can be used repeatedly. But it is necessary, if it contains too much iron, that it be deprived of this and any other undesired impurities by precipitating them with ammonia.

It has been shown that the iron is precipitated from the mother liquors saturated with iron in a dense and easily filterable form, though generally it has been precipitated in a slimy form, difficult to handle. The advantage results from the complete saturation. Moreover the sulphuric acid bound to the iron is recovered in the form of ammonium sulphate, which can be used anywhere in my process. The iron impurities are also obtained in a form that can be used with profit.

The decomposition of the ammonium sulphate, necessary in forming ammonium bisulphate or other bisulphates cannot be effected in the usual vessels of copper or iron, because they will be attacked; therefore silicon, aluminum, magnesium and their alloys are used. It is surprising to find that they are not attacked.

The behavior of the two alkali metals, aluminum and magnesium is so much the more remarkable as they are supposed to be easily oxidized and easily attacked by acids.

It is also very profitable to use the alloys of magnesium, aluminum and silicon with each other or with heavy metals, as materials for the vessels in which to produce ammonium bi-sulphate by smelting with ammonium sulphate.

For example, such melts could be made in vessels of ferro-silicon variably composed. There are used vessels of such metals or alloys, or the chambers are lined with such materials.

I claim—

1. Process for producing aluminum hydroxide from materials containing alumina, by treating them with sulphates, which comprises first heating an ammonium sulphate and splitting it into bisulphate and ammonia, then rendering soluble the alumina containing material by means of this bisulphate, filtering, and precipitating the filtrate by means of the ammonia previously split off, and regenerating the sulphate containing ammonia from the remaining mother liquor.

2. Process for producing aluminum hydroxide from materials containing alumina, by treating them with sulphates, which comprises first heating sulphate of ammonium in vacuo and splitting it into bisulphate and ammonia, then rendering soluble the alumina containing material by means of this bisulphate, filtering, and precipitating the filtrate by means of the ammonia previously liberated, and regenerating the sulphate containing ammonia from the mother liquor.

3. Process for producing aluminum hydroxide from materials containing alumina by treating them with sulphates, which comprises first heating a sulphate containing ammonia and splitting it into bisulphate and ammonia, then rendering soluble the alumina containing material by means of this bisulphate in autoclaves, filtering, and precipitating the filtrate by means of the ammonia previously liberated and regenerating the sulphate containing ammonia from the mother liquor.

4. Process of producing aluminum hydroxide from materials containing alumina by treating them with sulphates, which comprises first heating a sulphate containing ammonia and splitting it into bisulphate and ammonia, then rendering soluble the alumina containing material by means of this bisulphate while adding sulphate of ammonia for freeing the material from iron, filtering, and precipitating the filtrate by means of the ammonia previously liberated, and regenerating the sulphate containing ammonia from the mother liquor.

5. Process for producing aluminum hydroxide from materials containing alumina by treating them with sulphates, which comprises first heating a sulphate containing ammonia and splitting it into bisulphate and ammonia, then rendering soluble the alumina containing material by means of this bisulphate, filtering, and concentrating the filtrate and removing iron by a hot saturated solution containing an excess of sulphate of ammonium, then adding ammonium alum crystallized therefrom, after having washed it with sulphate of ammonium, to a precipitating solution containing several times the quantity of ammonia required, separating the hydroxide of aluminum from the sulphate of ammonium formed and using the mother liquor containing the sulphate of ammonium so obtained for cleaning new raw material.

6. Process for producing aluminum hydroxide from materials containing alumina by treating them with sulphates, which comprises first heating a sulphate containing ammonia and splitting it into bisulphate and ammonia, then rendering soluble the alumina containing material by means of this bisulphate, filtering, and concentrating the filtrate and adding the impure salt to a hot, saturated solution containing an excess of sulphate of ammonium, then adding the ammonia alum crystallized therefrom, after having washed it with sulphate of ammonium, to a solution containing several times the quantity of ammonia required for precipitation, separating the hydroxide of aluminum from the sulphate of ammonium formed, freeing the mother liquor from impurities by ammonia, and treating new raw material with such purified mother liquor.

7. Process for producing aluminum hydroxide from materials containing alumina by treating them with sulphates, which comprises first heating a sulphate containing ammonia and splitting it, in chambers chemically inert to the decomposition products, to bisulphate and ammonia, then rendering soluble the aluminum containing materials by means of this bisulphate, filtering, and precipitating the filtrate by means of the ammonia previously formed, and regenerating the sulphate containing ammonia from the mother liquor.

8. Process for producing aluminum hydroxide from materials containing alumina, which comprises heating neutral ammonium sulphate to form ammonia and bisulphate of ammonium decomposing such materials with said bisulphate, dissolving the sulphates so formed, separating the residues and adding to the concentrated filtrate a hot saturated solution of sulphate containing an excess of sulphate of ammonium, crystallizing ammonium alum from the solution and introducing the crystals into a solution containing a great excess of the ammonia previously set free, thereby precipitating the aluminum hydroxide, and regenerating the mother liquor for return into the cycle of operations.

In testimony that I claim the foregoing as my invention, I have signed by name in presence of two subscribing witnesses.

Dr. MAX BUCHNER.

Witnesses:
CHARLES L. TURRILL,
ARTHUR SCHROEDER.